(12) United States Patent
Moriyama et al.

(10) Patent No.: US 10,837,809 B2
(45) Date of Patent: Nov. 17, 2020

(54) SENSOR FAILURE DIAGNOSIS DEVICE, METHOD AND PROGRAM

(71) Applicant: KABUSHIKI KAISHA TOSHIBA, Tokyo (JP)

(72) Inventors: Takuro Moriyama, Kanagawa (JP); Hideyuki Aisu, Kanagawa (JP); Hisaaki Hatano, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 320 days.

(21) Appl. No.: 15/908,742

(22) Filed: Feb. 28, 2018

(65) Prior Publication Data

US 2018/0188083 A1 Jul. 5, 2018

Related U.S. Application Data

(63) Continuation of application No. PCT/JP2016/085101, filed on Nov. 28, 2016.

(30) Foreign Application Priority Data

Feb. 5, 2016 (JP) ................. 2016-021310

(51) Int. Cl.
  *G01D 18/00* (2006.01)
  *G01D 3/08* (2006.01)
  *G05B 23/02* (2006.01)

(52) U.S. Cl.
  CPC ............. *G01D 18/00* (2013.01); *G01D 3/08* (2013.01); *G05B 23/0232* (2013.01)

(58) Field of Classification Search
  CPC ......... G01D 18/00; G01D 21/02; G01D 3/08; G05B 23/0232

(Continued)

(56) References Cited

U.S. PATENT DOCUMENTS

| 5,132,920 A | 7/1992 | Bellows et al. |
| 6,609,036 B1* | 8/2003 | Bickford ............. G05B 23/024 |
| | | 700/30 |

(Continued)

FOREIGN PATENT DOCUMENTS

| JP | 01-156895 A | 6/1989 |
| JP | 2003-207373 A | 7/2003 |

(Continued)

OTHER PUBLICATIONS

International Preliminary Report on Patentability dated Aug. 16, 2018, in International Application No. PCT/JP2016/085101.

(Continued)

*Primary Examiner* — John H Le
(74) *Attorney, Agent, or Firm* — Finnegan, Henderson, Farabow, Garrett & Dunner, L.L.P.

(57) ABSTRACT

According to one embodiment, a sensor failure diagnosis device includes a drift estimator and a global rank determiner. The drift estimator estimates, based on data on measured values from sensors contained in a plurality of sensor groups including a sensor under inspection, whether or not drift failure that is steady deviation of a measured value from a true value has occurred in the sensor under inspection or a degree of the drift failure. The global rank determiner determines global ranks that are priorities of the plurality of sensor groups in the inspection based on a plurality of estimated results by the drift estimator.

6 Claims, 9 Drawing Sheets

(58) Field of Classification Search
USPC ......... 702/85, 116, 184, 183; 700/30; 703/2; 706/12
See application file for complete search history.

(56) References Cited

U.S. PATENT DOCUMENTS

| | | | |
|---|---|---|---|
| 8,577,049 B2 | 11/2013 | Soelberg et al. | |
| 8,676,727 B2 | 3/2014 | Suyama et al. | |
| 2004/0002776 A1* | 1/2004 | Bickford | G05B 23/0275 700/30 |
| 2014/0195184 A1 | 7/2014 | Maeda et al. | |

FOREIGN PATENT DOCUMENTS

| | | |
|---|---|---|
| JP | 2003-271231 A | 9/2003 |
| JP | 2005-338049 A | 12/2005 |
| JP | 2006-039650 A | 2/2006 |
| JP | 2009-175870 A | 8/2009 |
| JP | 2010-190582 A | 9/2010 |
| JP | 2011-75373 | 4/2011 |
| JP | 2013-73414 A | 4/2011 |
| JP | 4782734 B2 | 9/2011 |
| JP | 4786670 B2 | 10/2011 |
| JP | 5025776 | 6/2012 |
| JP | 5253218 B2 | 7/2013 |
| JP | 5337909 | 8/2013 |
| JP | 2013-250929 A | 12/2013 |
| JP | 5792667 B | 8/2015 |
| WO | WO 02/18879 A1 | 3/2002 |

OTHER PUBLICATIONS

E.R. Gansner, et al., "A Technique for Drawing Directed Graphs." IEEE Transaction on Software Engineering, vol. 19, pp. 214-230, 1993.

T. Moriyama, et al., "A Method to Diagnose Drift Faults Arising in the Sensors of Air-Condition Machines for Buildings," The Papers of Technical Meeting on Smart Facilities. IEE Japan 2016(1-7), 25-30, Jan. 15, 2015.

T. Moriyama, "Drift Anomaly Detection Technology for Sensors Linked With Building Air-Conditioning Systems." Toshiba Review vol. 71, No. 5. Sep. 2016.

* cited by examiner

| MEASUREMENT DATE AND TIME | MEASUREMENT STATE | MEASURED VALUE |
|---|---|---|
| 0:00 | STEADY STATE | 0.1 |
| 0:01 | STEADY STATE | 0.5 |
| 0:02 | NOT IN OPERATION | 1.2 |

MEASURED VALUE DATA

FIG. 3

| ID | TYPE | ACCEPTABLE AMOUNT OF DRIFT |
|---|---|---|
| SA1 | THERMOMETER | $\leq 1°C$ |
| SA2 | HYGROMETER | $\leq 10\%RH$ |
| SA3 | $CO_2$ DENSITOMETER | $\leq 300ppm$ |

SENSOR GROUP INFORMATION

FIG. 4

| RECOMMENDED INSPECTION ORDER | DEVICE NAME |
|---|---|
| FIRST RANK | DEVICE "B" |
| SECOND RANK | DEVICE "D" |
| THIRD RANK | DEVICE "C" |
| FOURTH RANK | DEVICE "A" |

FIG. 5

| CANDIDATE | PRIORITY | CONDITION |
|---|---|---|
| $sim_1$ | FIRST | SENSORS ARE ALL THERMOMETERS AND MEASUREMENT STATE OF EACH SET OF MEASURED VALUE DATA IS STEADY STATE |
| $sim_2$ | SECOND | MEASUREMENT STATE OF EACH SET OF MEASURED VALUE DATA IS STEADY STATE |
| $sim_3$ | THIRD | OTHER THAN ABOVE |

FIG. 8

| CANDIDATE | PRIORITY | CONDITION |
|---|---|---|
| $rsim_1$ | FIRST | SENSORS ARE ALL THERMOMETERS AND MEASUREMENT STATE OF EACH SET OF MEASURED VALUE DATA IS STEADY STATE |
| $rsim_2$ | SECOND | MEASUREMENT STATE OF EACH SET OF MEASURED VALUE DATA IS STEADY STATE |
| $rsim_3$ | THIRD | OTHER THAN ABOVE |

FIG. 11

SENSOR FAILURE DIAGNOSIS DEVICE, METHOD AND PROGRAM

CROSS-REFERENCE TO RELATED APPLICATIONS

The present application is a Continuation of International Application No. PCT/JP2016/085101, filed on Nov. 28, 2016, the entire contents of which is hereby incorporated by reference.

FIELD

Embodiments described herein relate to a device, method, and program for diagnosing failure of a sensor and a device.

BACKGROUND

There has been a known remote monitoring device that remotely diagnoses abnormality and failure of a device based on data on a measured value history. A sensor itself is the target of the remote monitoring in some cases, and failure including drift failure can occur in the sensor itself due to degradation over time, dirt, and other factors. The drift failure of the sensor described herein is failure characterized in that a measured value obtained by measurement of a measurement target (such as temperature and humidity) with a sensor is steadily deviated away from a true value that is a correct value of the measurement target.

At present, to detect drift failure, a worker needs to go to the place where a sensor is installed and inspect the sensor. The inspection is not performed on a sensor basis but is performed on a device basis in many cases. That is, a target device is selected, and inspection is collectively performed on a plurality of sensors associated with the target device. There are the following three primary reasons for the collective inspection: First, sensors in a sensor group associated with a device are physically present in positions close to one another in many cases, the collective inspection is preferable in the viewpoint of work efficiency; second, the number of actions of stopping the device and other actions involved in the inspection can be reduced, whereby the burden on a user of the device can be reduced; and finally, the sensor group associated with the device is a sensor group necessary to maintain the function of the device, and collective inspection is more preferable than partial inspections from the viewpoint of maintenance of the function of the device.

The inspection described above, which involves labor costs of the worker and the burden on the device user and in which the number of workers and hours that can be spent for the inspection are restricted in many cases, is required to efficiently performed. To this end, Patent Literatures 2 to 5 each propose a sensor failure diagnosis device that diagnoses abnormality and failure of a sensor based on the separation of data on a history of measured value from values estimated using a model.

A sensor failure diagnosis device of related art including those described in Patent Literatures described above, however, diagnoses whether or not drift failure of each sensor has occurred and the degree of the drift failure. Since drift failure gradually becomes worse with time in many cases, it is difficult to determine the boundary between abnormality and normality, and a decision maker cannot decide whether sensor inspection can be performed on a priority basis based on the result of the diagnosis unless sufficient diagnosis accuracy is guaranteed.

BRIEF DESCRIPTION OF THE DRAWINGS

FIG. 3 shows an example of measured value data.

FIG. 4 shows an example of sensor group information.

FIG. 5 shows an example of global ranks displayed on a display device.

FIG. 8 shows an example of a table that stores candidates of a variable-length argument function "sim".

FIG. 11 shows an example of a table that stores candidates of a variable-length argument function "rsim".

DETAILED DESCRIPTION

According to one embodiment, a sensor failure diagnosis device includes a drift estimator and a global rank determiner. The drift estimator estimates, based on data on measured values from sensors contained in a plurality of sensor groups including a sensor under inspection, whether or not drift failure that is steady deviation of a measured value from a true value has occurred in the sensor under inspection or a degree of the drift failure. The global rank determiner determines global ranks that are priorities of the plurality of sensor groups in the inspection based on a plurality of estimated results by the drift estimator.

Embodiments of the present invention will be described below with reference to the drawings.

First Embodiment

Figure 1:
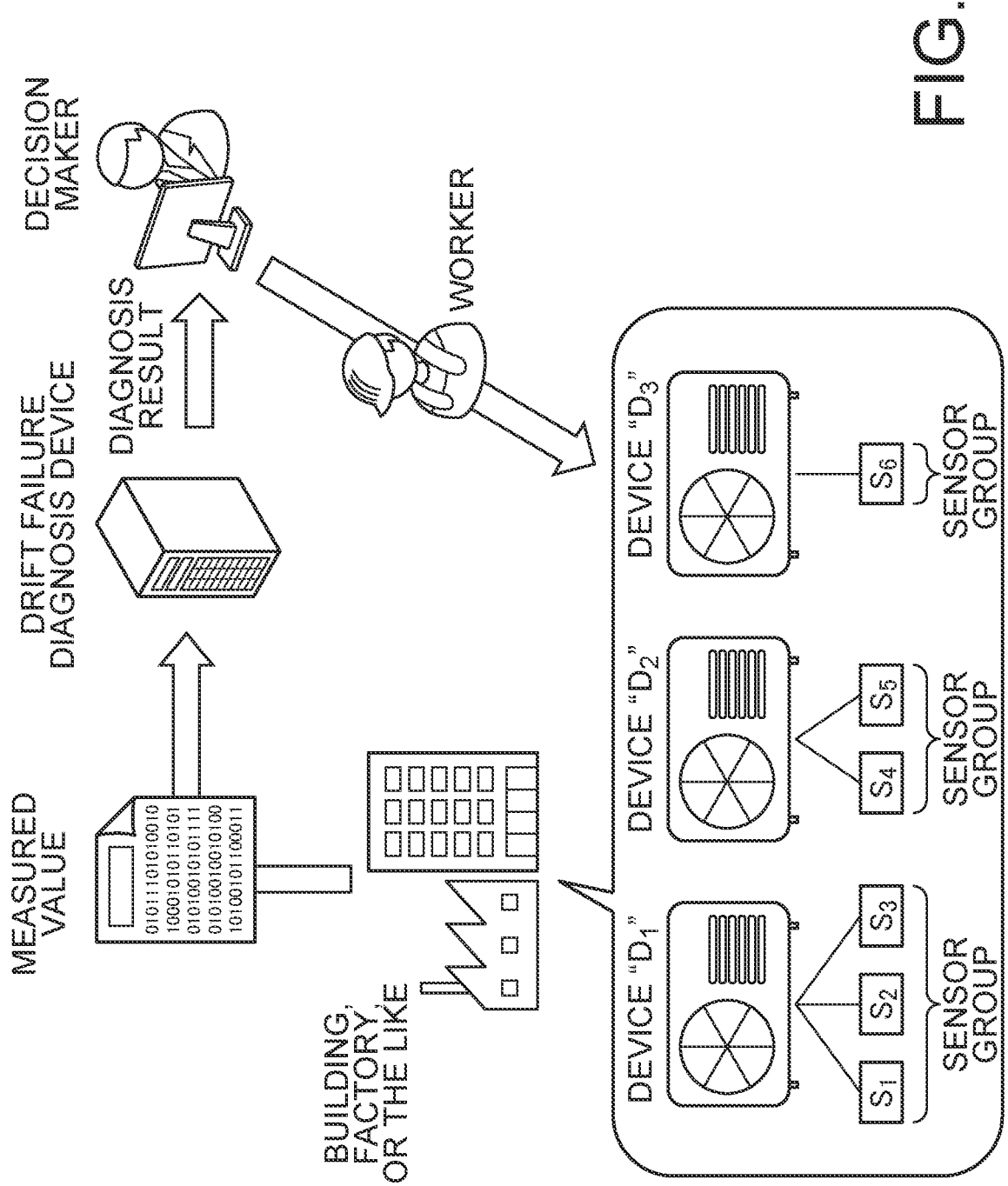
FIG. 1 describes an overview of a sensor failure diagnosis device.

A sensor failure diagnosis device (hereinafter referred to as "diagnosis device") according to a first embodiment will be described with reference to FIGS. 1 to 8. FIG. 1 describes an overview of the diagnosis device.

A plurality of devices and sensors are installed in a construction (such as building and factory) where an inspection is performed, as shown in FIG. 1. The devices are each provided with a sensor group. The sensor group described herein is one sensor or a set of a plurality of sensors associated with a device. A sensor associated with a device is a sensor that acquires information for monitoring and controlling the action of the device. A sensor associated with a device includes a sensor that is incorporated in the device and a sensor installed in a position outside the device.

For example, in the example shown in FIG. 1, devices "$D_1$" to "$D_3$" and sensors "$S_1$" to "$S_6$" are installed in the construction. The device "$D_1$" is provided with a sensor group formed of the sensors "$S_1$" to "$S_3$", the device "$D_2$" is provided with a sensor group formed of the sensors "$S_4$" and "$S_5$", and the device "$D_3$" is provided with a sensor group formed of the sensor "$S_6$". The sensor groups each contain an arbitrary number of sensors, as described above.

The diagnosis device estimates drift failure of each of the sensors based on values measured with the sensors and remotely collected from the construction and determines the priority of the sensor (sensor group) in the inspection based on the estimated result. The priority of each of the sensor groups is so determined that a larger degree of estimated drift failure of each sensor contained in the sensor group leads to a higher priority. The diagnosis device outputs, as a diagnosis result, the estimated result of drift failure of each sensor and the priority of each device (each sensor group).

A decision maker who makes decision on the inspection can select a device (sensor group) including a sensor having a large degree of estimated drift failure on a priority basis by selecting a device in accordance with the priorities determined by the diagnosis device.

A worker dispatched to the construction performs inspection on the sensor group set for in the device selected by the decision maker. For example, in a case where the devices "$D_1$" and "$D_2$" are selected, the worker performs inspection on the sensor group set for each of the devices "$D_1$" and "$D_2$", that is, the sensors "$S_1$" to "$S_5$". A sensor having a large degree of estimated drift failure can therefore be inspected on a priority basis. As a result, efficient sensor inspection can be performed.

Figure 2:
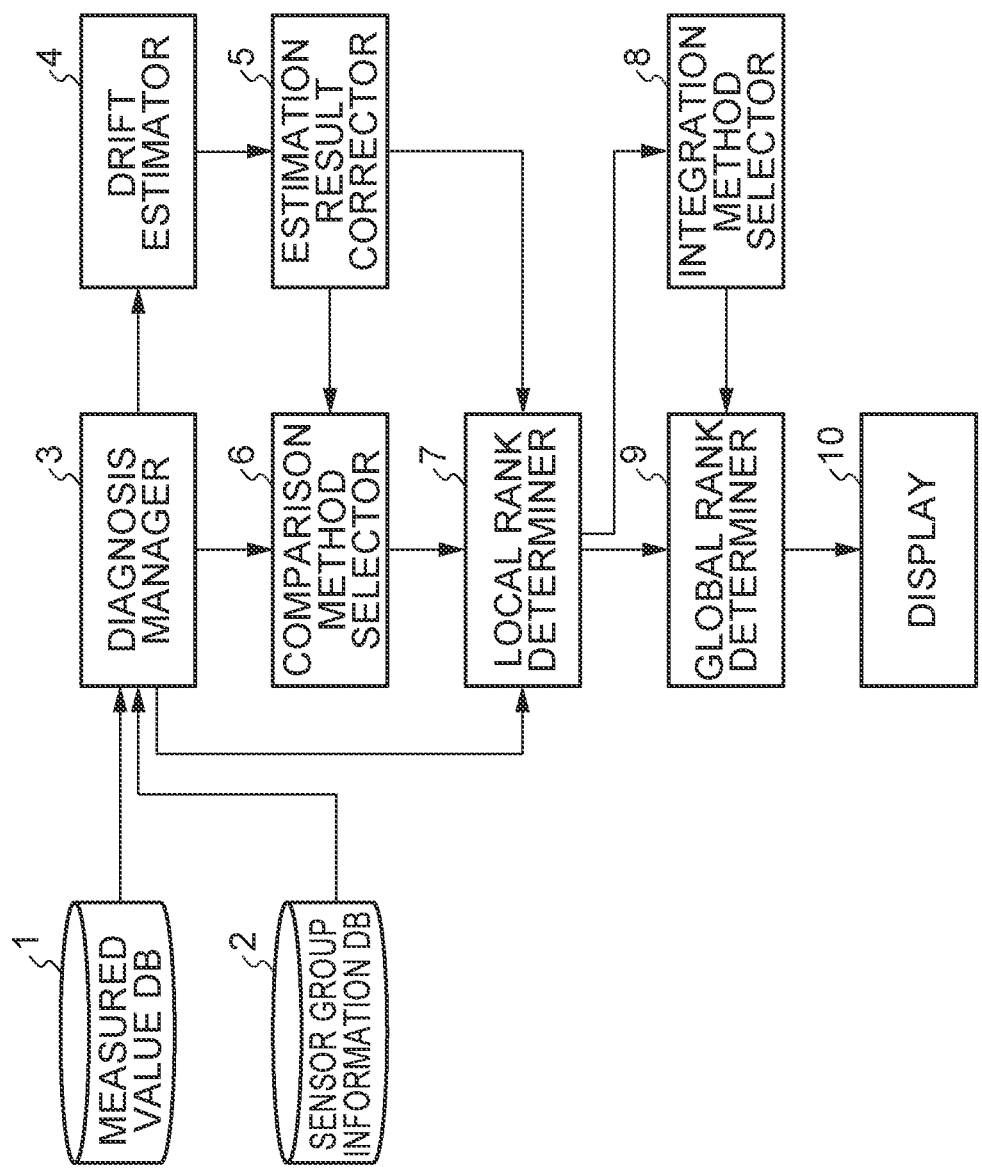
FIG. 2 shows the system configuration of a sensor failure diagnosis device according to a first embodiment.

The functional configuration of the diagnosis device according to the present embodiment will next be described. FIG. 2 shows an example of the diagnosis device according to the present embodiment. The diagnosis device shown in FIG. 2 includes a measured value DB (database) 1, a sensor group information DB 2, a diagnosis manager 3, a drift estimator 4, an estimation result corrector 5, a comparison method selector 6, a local rank determiner 7, an integration method selector 8, a global rank determiner 9, and a display 10.

The measured value DB 1 stores data on measured values that are measured with a plurality of sensors including each sensor under inspection and are remotely collected from the construction where the sensors are installed. That is, the data on a plurality of measured values stored in the measured value DB 1 are not limited to data on a measured value from each sensor under inspection. Measured value data contain measured values and the date and time when each of the measured values is obtained, but not necessarily. FIG. 3 shows an example of the measured value data stored in the measured value DB 1.

FIG. 3 shows three sets of measured value data from a certain sensor. Each record in FIG. 3 corresponds to measured value data. Each set of measured value data in FIG. 3 contains the measurement date and time, a measurement state, and a measured value. The measurement state is the state of the sensor or a device to which the sensor is associated at the measurement date and time or an instruction value instructed from a control system to the device. The measurement state includes, for example, a steady state, in operation, not in operation, and other states.

The measured value DB 1 stores such measured value data on a sensor basis. The measured value data may be stored in a table provided on a sensor basis or may be stored in a single table. In the case where data on measured values from a plurality of sensors are stored in a single table, each set of measured value data contains an identifier ("ID") of the sensor corresponding to the measured value data.

The sensor group information DB 2 stores sensor group information associated with each device. The sensor group information is information on a group of sensors (sensor group) associated with a device. Sensors in a sensor group are not limited to a sensor(s) under inspection. The sensor group information contains the identifier, the type, and an acceptable amount of drift of each sensor contained in the sensor group, but not limited thereto. The acceptable amount of drift is the amount of drift set in advance as a reference for diagnosis of drift failure. The amount of drift used herein is the amount of steady deviation of a value measured with a sensor from a true value. FIG. 4 shows an example of the sensor group information stored in the sensor group information DB 2. A group of sensors (sensor group) associated with a certain device "X" is hereinafter referred to as a sensor group "X".

FIG. 4 shows the sensor group information on the sensor group in a certain device "A". The sensor group information shown in FIG. 4 contains the identifier ("ID"), the type, and the acceptable amount of drift of each sensor contained in the sensor group "A". In the example shown in FIG. 4, the sensor group "A" includes three sensors "SA1", "SA2", and "SA3". For example, the sensor "SA1" is a thermometer, and the acceptable amount of drift is smaller than or equal to 1° C.

The sensor group information DB 2 stores the sensor group information on a device basis. The sensor group information may be stored in a table provided on a device basis or may be stored in a single table. In the case where a plurality of pieces of sensor group information on the sensor groups in a plurality of devices are stored in a single table, each piece of sensor group information contains an identifier ("ID") of the device corresponding to the sensor group information.

The diagnosis manager 3 (hereinafter referred to as "manager 3") manages diagnosis performed by the diagnosis device. The manager 3, when the diagnosis starts, acquires the measured value data and the sensor group information used in the diagnosis from the measured value DB 1 and the sensor group information DB 2 and forwards the measured value data and the sensor group information to the drift estimator 4 and the comparison method selector 6.

The drift estimator 4 (hereinafter referred to as "estimator 4") estimates drift failure of each sensor based on the measured value data and the sensor group information received from the manager 3. In the following sections, the description will be made of a case where the estimator 4 estimates the amount of drift. The amount of drift described herein is the amount of steady deviation of a measured value from a sensor from a true value. The estimator 4 can use, as a method for estimating the amount of drift, an arbitrary known estimation method, such as an estimation method using a neural network. A case where the estimator 4 estimates whether or not drift failure has occurred will be described later.

The estimator 4 groups obtained estimation results on a sensor group basis and forwards the grouped estimation results to the estimation result corrector 5. The estimator 4 may further output the estimation results to an external device and forward them the display 10.

The estimation result corrector 5 (hereinafter referred to as "corrector 5") corrects the estimation result on a sensor group basis received from the estimator 4 to an estimation result in a predetermined format and forwards the corrected estimation result to the comparison method selector 6 and the local rank determiner 7. The correction described herein includes normalization of an estimation result and adjustment of the data size. The estimation result corrected by the corrector 5 is called a corrected estimation result. The corrector 5 forwards the corrected estimation result to the comparison method selector 6 and the local rank determiner 7.

The comparison method selector 6 selects a comparison method used by the local rank determiner 7 based on the measured value data and the sensor group information received from the manager 3 and the corrected estimation result received from the corrector 5. The comparison method is a method for comparing corrected estimation results for two sensor groups to determine the priorities of the two sensor groups. In a case where a comparison method is set in advance, the diagnosis device does not need to include the comparison method selector 6. The comparison method selector 6 notifies a selected comparison method to the local rank determiner 7.

The local rank determiner 7 determines local ranks based on the corrected estimation results received from the corrector 5 and the comparison method notified from the comparison method selector 6. The local ranks are the priorities of the two devices (sensor groups). The determination of the local ranks corresponds to determination of which of the two devices has a higher priority.

Specifically, the local rank determiner 7 selects the combination of two devices (sensor groups) from a plurality of devices (sensor groups) contained in the corrected estimation results. The local rank determiner 7 then compares the corrected estimation results corresponding to the two devices (sensor groups) contained in the combination based on the comparison method received from the comparison method selector 6 to determine the local ranks. The local rank determiner 7 determines the local ranks for the entirety or part of generable combinations of two devices (sensor groups) and forwards the determined local ranks to the integration method selector 8 and the global rank determiner 9.

The integration method selector 8 selects an integration method used by the global rank determiner 9 based on the local ranks received from the local rank determiner 7. The integration method is a method for determining global ranks, which are the priorities of all devices (sensor groups), from the local ranks, which are the priorities of two devices (sensor groups). In a case where an integration method is set in advance, the diagnosis device does not need to include the integration method selector 8. The integration method selector 8 notifies the selected integration method to the global rank determiner 9.

The global rank determiner 9 determines the global ranks based on the local ranks received from the local rank determiner 7 and the integration method notified from the integration method selector 8. The global rank determiner 9 forwards the determined global ranks to the display 10. The global rank determiner 9 may output the determined global ranks to an external device.

The display 10 converts the global ranks received from the global rank determiner 9 into image data or text data in a predetermined format and outputs the converted data to a display device 103, which will be described later. The display device 103 thus displays the global ranks in the predetermined format. The display 10 may further cause the display device 103 to display, for example, the estimation results received from the drift estimator 4.

FIG. 5 shows an example of the global ranks displayed on the display device 103. In the example shown in FIG. 5, the global ranks are displayed in the form of a recommended inspection order, which shows that the device "B" has the first rank, the device "D" has the second rank, the device "C" has the third rank, and the device "A" has the fourth rank.

The hardware configuration of the diagnosis device according to the present embodiment will next be described. The diagnosis device according to the present embodiment is formed of a computer 100. Examples of the computer 100 may include a server, a client, a microcomputer, and a general-purpose computer.

Figure 6:
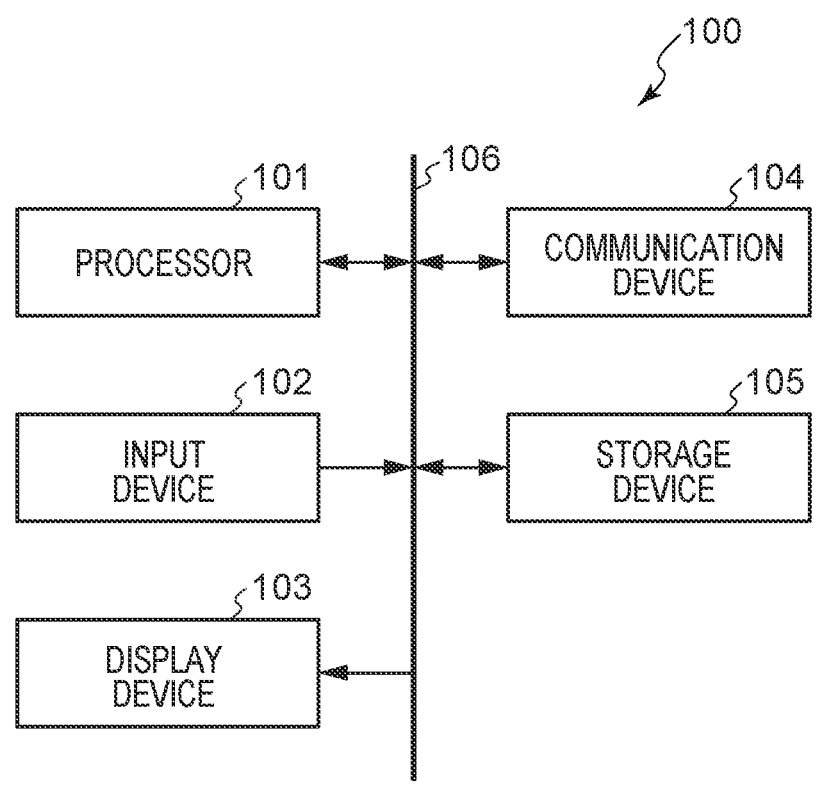
FIG. 6 shows an example of a computer.

FIG. 6 shows an example of the computer 100. The computer shown in FIG. 6 includes a processor 101, an input device 102, the display device 103, a communication device 104, and a storage device 105. The processor 101, the input device 102, the display device 103, the communication device 104, and the storage device 105 are connected to each other via a bus 106.

The processor 101 is an electronic circuit including a control device and a computation device of the computer 100. The processor 101 can, for example, be a central processing unit (CPU), a microprocessor, a digital signal processor (DSP), a controller, a microcontroller, a state machine, an application-specific integrated circuit, a field programmable gate array (FPGA), a programmable logic device (PLD), or a combination thereof.

The processor 101 performs computation based on data and a program inputted from the devices (input device 102, communication device 104, and storage device 105, for example) connected to the processor 101 via the bus 106 and outputs a computation result and a control signal to the devices (display device 103, communication device 104, and storage device 105, for example) connected to the processor 101 via the bus 106. Specifically, the processor 101 executes an OS (operating system) of the computer 100, a sensor failure diagnosis program (hereinafter referred to as "diagnosis program"), and other programs to control the devices that form the computer 100.

The diagnosis program is a program that causes the computer 100 to achieve the aforementioned functional configurations of the diagnosis device. The diagnosis program is stored on a non-transitional tangible computer readable storage medium. The storage medium described above is, for example, an optical disk, a magneto-optical disk, a magnetic disk, a magnetic tape, a flash memory, or a semiconductor memory, but not limited thereto. When the processor 101 executes the diagnosis program, the computer 100 functions as the diagnosis device.

The input device 102 is a device for inputting information to the computer 100. The input device 102 is, for example, a keyboard, a mouse, or a touch panel, but not limited thereto. A user can input an instruction of selection of a diagnosis target, an instruction of start of the diagnosis, and other instructions by using the input device 102.

The display device 103 is a device for displaying still images and video images. The display device 103 is, for example, an LCD (liquid crystal display), a CRT (cathode ray tube), or a PDP (plasma display), but not limited thereto. The display device 103 displays, as an estimation result, the global ranks, an estimated amount of drift of each sensor, and other pieces of information, as described above.

The communication device 104 is a device for allowing the computer 100 to communicate with an external device in a wireless or wired manner. The communication device 104 is, for example, a modem, a hub, or a router, but not limited thereto. The manager 3 may remotely collect, via the communication device 104, measured value data from a construction where sensors are installed.

The storage device 105 is a storage medium that stores the OS of the computer 100, the diagnosis program, data necessary for execution of the diagnosis program, data created by the execution of the diagnosis program, and other pieces of information. The storage device 105 includes a primary storage device and an external storage device. The primary storage device is, for example, a RAM, a DRAM, or an SRAM, but not limited thereto. The external storage device is, for example, a hard disk drive, an optical disk drive, a flash memory, or a magnetic tape, but not limited thereto. The measured value DB 1 and the sensor group information DB 2 may be constructed in the storage device 105 or in an external server.

The computer 100 may include one or more processors 101, input devices 102, display devices 103, communication devices 104, and storage devices 105, and a printer, a scanner, and other peripheral devices may be connected to the computer 100.

The diagnosis device may be configured by the computer 100, which is a single computer, or may be configured as a system formed of a plurality of computers 100 connected to each other.

Further, the diagnosis program may be stored in advance in the storage device 105 of the computer 100, may be stored on a storage medium external to the computer 100, or may be uploaded to the Internet. In any of the cases described above, the diagnosis program is installed in the computer 100 and executed to achieve the functions of the diagnosis device.

Figure 7:
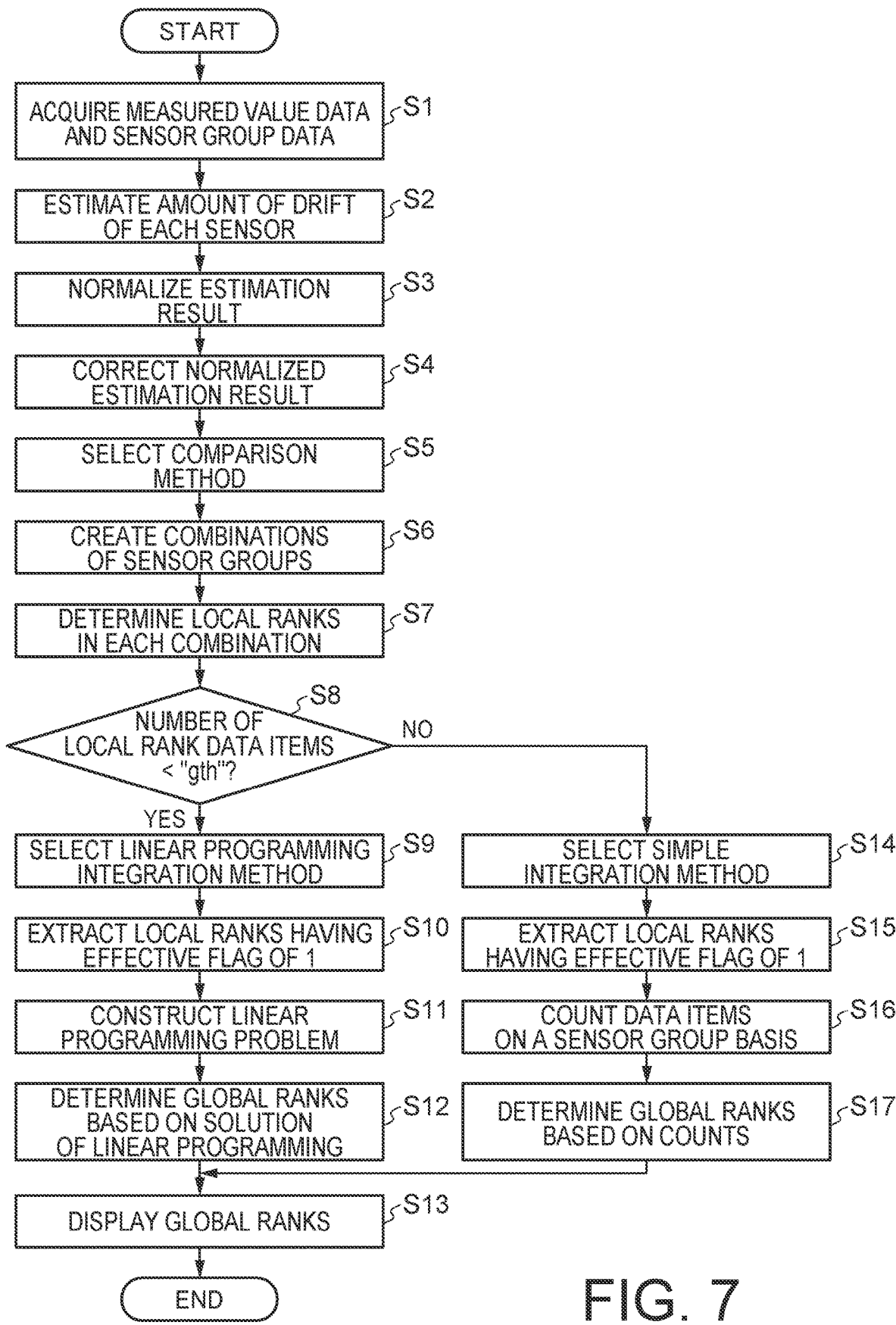
FIG. 7 is a flowchart showing an example of diagnosis.

The operation of the diagnosis device according to the present embodiment will next be described. FIG. 7 is a flowchart showing an example of the diagnosis performed by the diagnosis device according to the present embodiment. In the following diagnosis, the diagnosis device estimates the amount of drift of each sensor multiple times (i.e., a plurality of times) and statistically processes a plurality of resultant estimation results to determine reliable global ranks.

When the diagnosis starts, the manager 3 acquires measured value data and sensor group information used in the diagnosis from the measured value DB 1 and the sensor group information DB 2, respectively, (step "S1"), as shown in FIG. 7. In this process, the manager 3 acquires multiple sets of measured value data that differ from one another in terms of measurement date and time, measurement state, and other factors on a sensor group basis. It is, for example, conceivable that the manager 3 acquires a measured value data group on a weekday in a summer period, a measured value data group on a holiday in the summer period, a measured value data group on a weekday in a winter period, and a measured value data group on a holiday in the winter period on a sensor group basis. The manager 3 may acquire measured value data on the same measurement date and point of time and in the same measurement state or on differ measurement dates and points of time and in different measurement states. The manager 3 forwards the thus acquired measured value data and sensor group data to the estimator 4.

The estimator 4 then estimates the amount of drift of each sensor (performs drift estimation) multiple times based on the acquired measured value data and sensor group data received from the manager 3 (step "S2"). In this process, the estimator 4 performs the drift estimation by using different measured value data whenever the drift estimation is performed. The method for performing the drift estimation is arbitrarily selected, as described above. The drift estimation on a sensor basis is performed the same multiple times in the same sensor group but may be performed different multiple times in different sensor groups.

The estimator 4 integrates the amounts of drift of the sensors obtained by the drift estimation on the sensor group basis to create an estimation result for the sensor group. In the following description, an estimation result created on a sensor group basis is expressed in the form of a matrix having "n" rows and "m" columns. Reference character "n" represents the number of drift estimations, and reference character "m" represents the number of sensors contained in the sensor group. Specifically, an estimation result for each sensor group is expressed as follows:

[Expression 1]

$$R = \begin{bmatrix} 0.1 & 0.2 & \ldots & -0.2 & 0.9 \\ \vdots & \vdots & \vdots & \vdots & \vdots \\ \vdots & \vdots & \vdots & \vdots & \vdots \\ \vdots & \vdots & \vdots & \vdots & \vdots \\ 1.2 & -0.5 & \ldots & 0.4 & -0.3 \end{bmatrix} \in \mathbb{R}^{n \times m} \quad (1)$$

In Expression (1), "R" denotes an estimation result for a sensor group. Each row in the estimation result "R" represents an estimation result in each drift estimation, and each element represents an estimated amount of drift. The unit of the amount of drift is the same as that of a measured value. For example, the upper right element of 0.9 represents the amount of drift of the "m"-th sensor in first drift estimation. The estimator 4 forwards the thus obtained estimation result "R" for each sensor group to the corrector 5.

The corrector 5 subsequently corrects the estimation result "R" for each sensor group received from the estimator 4 to an estimation result "R" in the predetermined format. The reason for this is that it is conceivable that the estimation results "R" for the sensor groups contains different sizes and units.

For example, in a case where a sensor group "A" contains five thermometers and the drift estimation is performed 30 times on each of the thermometers, an estimation result "$R^{(A)}$" for the sensor group "A" is a matrix having 30 rows and 5 columns, and the unit of each element (amount of drift) is, for example, ° C.

On the other hand, in a case where a sensor group "B" contains three hygrometers and the drift estimation is performed 100 times on each of the hygrometers, an estimation result "$R^{(B)}$" for the sensor group "B" is a matrix having 100 rows and 3 columns, and the unit of each element (amount of drift) is, for example, % RH.

In the case where the estimation results "R" for the sensor groups have different sizes and units, as described above, it is difficult to perform the comparison among estimation results performed for determination of the local ranks, which will be described later. The corrector 5 therefore corrects the estimation result "R" for each sensor group in such a way that the comparison among estimation results is readily performed.

The corrector 5 first normalizes the estimation result "R" for each sensor group (step "S3"). Specifically, the corrector 5 divides each element of the estimation result "R" by the corresponding acceptable amount of drift. As a result, each element of the estimation result "R" is converted into the ratio to the acceptable amount of drift, which is a dimensionless quantity. The normalized estimation result "$R^{(A)}$" for the sensor group "A" is called a normalized estimation result $R_1^{(A)}$". The normalized estimation result "$R_1^{(A)}$" is expressed by the following expression:

[Expression 2]

$$R_1^{(A)} := [\vec{r}_1^{(A)}/d_1^{(A)}, \vec{r}_2^{(A)}/d_2^{(A)}, \ldots \vec{r}_m^{(A)}/d_m^{(A)}] \in \mathbb{R}^{n \times m} \quad (2)$$

The term "$d_i^{(A)}$" ("i"=1 to m) in Expression (2) represents the acceptable amount of drift of the sensor corresponding to the "i"-th column of the estimation result "$R^{(A)}$". The term "$r_j^{(A)}$" ("j"=1 to m) is a column vector corresponding to the "j"-th column of the estimation result "$R^{(A)}$". The corrector 5 normalizes the estimation result "R" for each sensor group and calculates the normalized estimation result "$R_1$".

The corrector 5 then adjusts the data size of the normalized estimation result "$R_1$" for each sensor group by using random sampling (step "S4") to calculate a corrected estimation result "$R_2$". Specifically, the corrector 5 first expresses the normalized estimation result "$R_1$" for each sensor group in the form of the following row vector:

[Expression 3]

$$R_1=[\rho_1,\rho_2,\ldots,\rho_n]^T \in \mathbb{R}^{n \times m} \quad (3)$$

In Expression 3, $\rho_i$ ("i"=1 to "n") is a row vector corresponding to the "i"-th row of the normalized estimation result "$R_1$".

The corrector 5 then randomly extracts "k" (<"n") row vectors $\rho_i$ and averages the extracted "k" row vectors $\rho_i$ to calculate a row vector $\sigma$. The "j"-th element of the row vector $\sigma$ is the average of the "j"-th elements of the extracted "k" row vectors $\rho_i$.

The corrector 5 repeats the random sampling and the row vector averaging described above "N" times. Assume that a row vector $\sigma_i$ be the row vector $\sigma$ obtained by the "i"-th random sampling and averaging, and the corrected estimation result "$R_2$" is expressed below. It is noted that the number of aforementioned random sampling extractions "k" is one in some cases, and that the extraction may be so performed that the row vectors extracted in the random samplings do not overlap with each other.

[Expression 4]

$$R_2=[\sigma_1,\sigma_2,\ldots,\sigma_n]^T \in \mathbb{R}^{n \times m} \quad (4)$$

The corrected estimation result "$R_2$" is a matrix having "N" rows and "m" columns, as seen from Expression (4). The corrector 5 performs the method described above on the normalized estimation result "$R_1$" for each sensor group to calculate the corrected estimation result "$R_2$".

The correction described above allows the corrector 5 to adjust the data size of the normalized estimation result "$R_1$" to calculate the corrected estimation result "$R_2$" having a fixed number of rows for each sensor group. The correction described above further allows suppression of influence of disturbance as well as a fixed number of rows of estimation results.

As described above, the amount of drift used herein is the amount of steady deviation of a measured value from a sensor from a true value. However, influence of disturbance may wildly increase and decrease the amount of drift estimated by the estimator 4. In this case, in consideration of the steadiness of the amount of drift, it is appropriate to modify downwardly an estimated amount of drift in a case where it is greater than the others and modify upwardly an estimated amount of drift in a case where it is smaller than the others. The operation described above can be achieved by averaging a plurality of estimated amounts of drift, and the correction described above including the operation leads to suppression of influence of disturbance.

The corrector 5 forwards the thus obtained corrected estimation result "$R_2$" for each sensor group to the comparison method selector 6 and the local rank determiner 7.

Having received the corrected estimation results "$R_2$" from the corrector 5, the comparison method selector 6 selects a method, used by the local rank determiner 7, for comparing the corrected estimation results "$R_2$" with one another (step "S5"). Specifically, the comparison method selector 6 selects a variable-length argument function "sim: $R^m \rightarrow R$".

The variable-length argument function "sim" is a function for evaluating the degree of drift failure on a sensor group basis. The variable-length argument function "sim" returns an evaluation value of each row of a corrected estimation result "$R_2$". Therefore, when a corrected estimation result "$R_2$" is substituted into the variable-length argument function "sim", "N" evaluation values are obtained. The variable-length argument function "sim" is so designed in advance as to return a greater evaluation value when the degree of drift failure on a sensor group basis is higher, that is, the estimated amount of drift contained in each row is greater. In the present embodiment, the reason why the variable-length argument function "sim" is used as the comparison method is that it is expected that the number of sensors "m" contained in a sensor group varies on a sensor group basis. In a case where the number of sensors "m" contained in each sensor group is fixed, the comparison method does not need to be a variable-length argument function.

The variable-length argument function "sim" can, for example, be "mean(abs(•))". A function "abs(•):$R^m \rightarrow R^m$" is a variable-length argument function that converts the value of each element of a vector that is assigned as the argument (each row vector of corrected estimation result "$R_2$") into the absolute value of the element and returns the absolute values. A function "mean(•):$R^m \rightarrow R$" is a variable-length argument function that returns the average of the elements of a vector that is assigned as the argument (each row vector of corrected estimation result "$R_2$" having elements each converted into absolute value). Functions usable as the variable-length argument function "sim" are not limited to those described above and can be arbitrarily designed.

The comparison method selector 6 stores in advance a plurality of candidates of the variable-length argument function "sim", such as those described above. The variable-length argument functions "sim" are related to respective predetermined conditions. The conditions are each set in accordance, for example, with a measured value from a sensor, the statistic properties of the measured value, the sensor group information, the corrected estimation result "$R_2$", and the statistic properties of the corrected estimation result "$R_2$".

FIG. 8 shows an example of a table that is provided in the comparison method selector 6 and stores candidates of the variable-length argument function "sim". The table shown in FIG. 8 stores three candidates "$sim_1$", "$sim_2$", and "$sim_3$" of the variable-length argument function "sim". The candidates are each related to its priority and condition. For example, the candidate "$sim_1$" has the first priority and a condition in which "the sensors are all thermometers and the measurement state of each set of measured value data is the steady state."

The comparison method selector 6 refers to a table, such as that shown in FIG. 8, based on the measured value data and the sensor group information received from the manager 3 and the corrected estimation results "$R_2$" received from the corrector 5. The comparison method selector 6 then selects, as the comparison method (variable-length argument function "sim") used by the local rank determiner 7, a candidate of the variable-length argument function "sim" that satisfies the condition and has the highest priority. The comparison method selector 6 notifies the selected comparison method (variable-length argument function "sim") to the local rank determiner 7.

Having been notified about the comparison method from the comparison method selector 6, the local rank determiner 7 first prepares for determination of the local ranks. Specifically, the local rank determiner 7 creates a complete list of combinations of sensor groups, each of the combinations containing two sensor groups (step "S6").

For example, the local rank determiner 7, when it receives corrected estimation results "$R_2$" for three sensor groups "A", "B", and "C", creates three combinations, a combination containing the sensor groups "A" and "B", a combination containing the sensor groups "B" and "C", and a combination containing the sensor groups "A" and "C". The local rank determiner 7 saves the created combinations in an array "comb".

The local rank determiner 7 further initializes an array "rslt", which saves results of the comparison among the corrected estimation results "$R_2$".

The local rank determiner 7 then selects one of the combinations saved in the array "comb", compares the corrected estimation results "$R_2$" for the two sensor groups contained in the selected combination with each other, determines the local ranks of the two sensor groups in accordance with the result of the comparison, and save the determined local ranks in the array "rslt" (step "S7"). The local rank determiner 7 performs the local rank determination described above on the entirety or part of the combinations saved in the array "comb".

The local rank determination will be specifically described below with reference to a case where the combination containing the sensor groups "A" and "B" is selected. In the local rank determination in this case, the corrected estimation result "$R_2^{(A)}$" for the sensor group "A" and the corrected estimation result "$R_2^{(B)}$" for the sensor group "B" are compared with each other.

The local rank determiner 7 first substitutes the corrected estimation result "$R_2^{(A)}$" for the sensor group "A" into the variable-length argument function "sim" notified from the comparison method selector 6 to calculate an evaluation value vector $\xi^{(A)} \in $ "$R^N$" for the sensor group "A". The evaluation value vector $\xi^{(A)}$ is expressed by the following expression:

[Expression 5]

$$\vec{\xi}^{(A)} := [\xi_1^{(A)}, \xi_2^{(A)}, \ldots, \xi_N^{(A)}]^T \in \mathbb{R}^N \quad (5)$$

The evaluation value $\xi_i^{(A)}$ ("i"=1 to "N") in Expression (5) is an evaluation value corresponding to the "i"-th row vector $\sigma_i^{(A)}$ of the corrected estimation result "$R_2^{(A)}$". That is, $\xi_i^{(A)} = \text{sim}(\sigma_i^{(A)})$.

Similarly, the local rank determiner 7 substitutes the corrected estimation result "$R_2^{(B)}$" for the sensor group "B" into the variable-length argument function "sim" notified from the comparison method selector 6 to calculate an evaluation value vector $\xi^{(B)} \in $"$R^N$" for the sensor group "B".

The local rank determiner 7 then creates a vector $\xi^{(A,B)} \in$ "$R^{2N}$", in which the elements of the evaluation value vectors $\xi^{(A)}$ and $\xi^{(B)}$ are merged with each other. The vector $\xi^{(A,B)}$ is expressed as follows:

[Expression 6]

$$\vec{\xi}^{(A,B)} := [\xi_1^{(A)}, \xi_2^{(A)}, \ldots, \xi_N^{(A)}, \xi_1^{(B)}, \xi_2^{(B)}, \ldots, \xi_N^{(B)}]^T \in \mathbb{R}^{2N} \quad (6)$$

The local rank determiner 7 subsequently sorts the elements of the vector $\xi^{(A,B)}$ in the ascending order. The sorted vector is called a vector $\xi_{asc}^{(A,B)}$. The vector $\xi_{asc}^{(A,B)}$ corresponds to a vector having the evaluation values of the sensor groups "A" and "B" arranged in the ascending order (ascending order of degree of drift failure).

The local rank determiner 7 then calculates a vector $\zeta^{(A)} \in$ "$R^{2N}$" for the sensor group "A". The vector $\zeta^{(A)}$ is expressed by the following expression:

[Expression 7]

$$\vec{\zeta}^{(A)} = [\text{ratio}_A(\vec{\xi}_{asc}^{(A,B)}, 1), \text{ratio}_A(\vec{\xi}_{asc}^{(A,B)}, 2), \ldots$$
$$, \text{ratio}_A(\vec{\xi}_{asc}^{(A,B)}, 2N)]^T \in \mathbb{R}^{2N} \quad (7)$$

The "i"-th ("i"=1 to "2N") element $\text{ratio}_A(\xi_{asc}^{(A,B)}, i)$ of the vector $\zeta^{(A)}$ is the ratio of the elements of the evaluation value $\xi^{(A)}$ of the sensor group "A" contained in the first to "i"-th elements of the vector $\xi_{asc}^{(A,B)}$. For example, in a case where the first to fifth elements of the vector $\xi_{asc}^{(A,B)}$ contain three elements of $\xi^{(A)}$ and two elements of $\xi^{(B)}$, the ratio$_A$ ($\xi_{asc}^{(A,B)}, 5$) is 3/5=0.6.

Similarly, the local rank determiner 7 calculates a vector $\zeta^{(B)} \in$ "$R^{2N}$" for the sensor group "B". The "i"-th ("i"=1 to "2N") element $\text{ratio}_B(\xi_{asc}^{(A,B)}, i)$ of the vector $\zeta^{(B)}$ is the ratio of the elements of the evaluation value $\xi^{(B)}$ of the sensor group "B" contained in the first to "i"-th elements of the vector $\xi_{asc}^{(A,B)}$.

The values of $\text{ratio}_A(\xi_{asc}^{(A,B)}, i)$ and $\text{ratio}_B(\xi_{asc}^{(A,B)}, i)$ are therefore each a value greater than or equal to 0 but smaller than or equal to 1. Further, the sum of $\text{ratio}_A(\xi_{asc}^{(A,B)}, i)$ and $\text{ratio}_B(\xi_{asc}^{(A,B)}, i)$ is 1. Moreover, $\text{ratio}_A(\xi_{asc}^{(A,B)}, 2N)$ and $\text{ratio}_B(\xi_{asc}^{(A,B)}, 2N)$ are each 0.5.

The local rank determiner 7 extracts, out of the elements of the vector $\zeta^{(A)}$, an element having a maximum value smaller than 1 as a maximum value $\zeta_{max}^{(A)}$, extracts, out of the elements of the vector $\zeta^{(B)}$, an element having a maximum value smaller than 1 as a maximum value $\zeta_{max}^{(B)}$, and compares the maximum value $\zeta_{max}^{(A)}$ and the maximum value $\zeta_{max}^{(B)}$ with each other. The maximum values $\zeta_{max}^{(A)}$ and $\zeta_{max}^{(B)}$ represent how small the degrees of drift failure of the sensor groups "A" and "B", respectively.

In a case where the maximum value $\zeta_{max}^{(B)}$ is smaller than the maximum value $\zeta_{max}^{(A)}$ ($\zeta_{max}^{(B)} < \zeta_{max}^{(A)}$), the local rank determiner 7 determines the local rank of the sensor group "B" to be higher than the local rank of the sensor group "A". On the other hand, in a case where the maximum value $\zeta_{max}^{(A)}$ is smaller than the maximum value $\zeta_{max}^{(b)}$ ($\zeta_{max}^{(a)} < \zeta_{max}^{(B)}$), the local rank determiner 7 determines the local rank of the sensor group "A" to be higher than the local rank of the sensor group "B". This corresponds to determination of a higher rank of a sensor group having a higher degree of drift failure.

In a case where the maximum value $\zeta_{max}^{(A)}$ is equal to the maximum value $\zeta_{max}^{(B)}$ ($\zeta_{max}^{(A)} = \zeta_{max}^{(B)}$), the local rank determiner 7 determines that the local rank of the sensor group "A" is equal to the local rank of the sensor group "B". This corresponds to unknown local ranks of the sensor groups "A" and "B".

The local rank determiner 7 stores the thus determined local ranks of the sensor groups "A" and "B" in the array "rslt". The local rank determiner 7 also determines the local ranks of the sensor groups in the other combinations by using the same method described above and stores the determined local ranks in the array "rslt".

In the following description, the local ranks determined by the local rank determiner 7 are expressed by an array formed of three elements, a sensor group name having a higher local rank, a sensor group name having a lower local rank, and an effective flag. For example, [A, B, 1] represents that the local rank of the sensor group "A" is higher than the local rank of the sensor group "B". [B, A, 1] represents that the local rank of the sensor group "B" is higher than the local rank of the sensor group "A". Further, [A, B, 0] represents that the local rank of the sensor group "A" is equal to the local rank of the sensor group "B".

Having stored the local ranks for the entirety or part of the combinations in the array "rslt", the local rank determiner 7 forwards the array "rslt" to the integration method selector 8 and the global rank determiner 9.

In the present embodiment, the local ranks are determined in accordance with the comparison of $\zeta_{max}$, which has been invented based on the Wilcoxon rank sum test and in which influence of out-of-range values possibly contained in a plurality of drift estimation results "R" for two sensor groups is suppressed so that the two sensor groups can be appropriately compared with each other to determine the local ranks, but the method for comparing a plurality of drift estimation results with one another with influence of out-of-range values suppressed is not limited to the method described above. For example, the local ranks may instead be determined by comparing the medians of evaluation vectors, with each other.

The integration method selector 8 selects an integration method used by the global rank determiner 9 based on the received array "rslt". The following description will be made, by way of example, of a case where the integration method selector 8 selects a linear programming integration method or a simple integration method in accordance with the number of local rank data items contained in the array "rslt". The integration method used by the global rank determiner 9 and the method for selecting the integration method are, however, not limited to those described above and can be arbitrarily designed. For example, the global rank determiner 9 may use only the linear programming integration method or the simple integration method.

In the example shown in FIG. 7, the integration method selector 8 compares the number of local rank data items contained in the array "rslt" with a threshold "gth" (step S8), selects the linear programming integration method (step S9) in a case where the number of data items is smaller than the threshold "gth" (YES in step "S8"), and selects the simple integration method (step "S14") in a case where the number of data items is greater than or equal to the threshold "gth" (NO in step "S8"). The threshold "gth" is an arbitrarily settable parameter. The integration method selector 8 notifies the selected integration method to the global rank determiner 9.

The linear programming integration method will first be described. The linear programming integration method described herein is an integration method for constructing, from the local ranks stored in the array "rslt", a linear programming problem a solution of which is global ranks and deriving a solution of the constructed linear programming problem. According to the linear programming integration method, even in a case where the local rank data group stored in the array "rslt" has a circulatory structure, global ranks with high overall local rank satisfiability can be determined. The circulatory structure of a local rank data group will be described later.

The global rank determiner 9, when it is notified by the integration method selector 8 that the integration method is the linear programming integration method, extracts local ranks each having the effective flag of 1 from the array "rslt" (step "S10"). In the following description, to simplify the notation, an extracted local rank data group is expressed in a directed graph format, a graph "G":=(V, E). "V" represents a set of nodes of the graph "G". The nodes are each a sensor group name. "E" represents a set of edges. The start point of each of the edges is a low-local-rank sensor group name, and the end point of each of the edges is a high-local-rank sensor group name. Further, an edge the start and end points of which are nodes "v" and "w" is expressed as (v, w).

The aforementioned circulatory structure of a local rank data group corresponds to a directed closed path of the graph "G" and indicates that no global ranks that satisfy all local ranks are present. For example, this is the case where the local rank of the sensor group "A" is higher than the local rank of the sensor group "B", the local rank of the sensor group "B" is higher than the local rank of the sensor group "C", and the local rank of the sensor group "C" is higher than the local rank of the sensor group "A". In a case where the graph "G" is a directed non-cyclic graph having no directed closed path, topological sorting allows global ranks that satisfy all local ranks to be allocated to each node (sensor group). However, since the graph "G" is not always a directed non-cyclic graph, a method using linear programming shown below is used in the present embodiment to allocate global ranks to each node (sensor group) in such a way that contradiction to the local ranks is minimized. It is noted that the method for allocating global ranks that satisfy all local ranks is not limited to linear programming and may be another method.

The global rank determiner 9 subsequently constructs a linear programming problem a solution of which is global ranks based on the extracted local ranks (step "S11"). The thus constructed linear programming problem is expressed by the following expression:

[Expression 8]

$$\min_{\lambda,s} \sum_{(v,w)\in E} \lambda_v - \lambda_w + M s_{(v,w)} \quad (8)$$

$$\text{s.t. } \lambda_v - \lambda_w \geq 1 - s_{(v,w)}$$

$$\lambda_v \geq 0, \lambda_w \geq 0, s_{(v,w)} \geq 0$$

$$M \gg |V|$$

In Expression (8), $\lambda$ is a variable allocated on a sensor group name basis and having a value according to the global rank of the allocated sensor group, which means that the smaller the value of $\lambda$, the higher the inspection priority of the allocated sensor group. In Expression (8), "s" is a variable allocated on an edge basis and is used for accepting discrepancy between the local rank and the global rank. In Expression (8), "M" is a constant representing a penalty that occurs when the discrepancy between the local rank and the global rank is accepted by "s" and is set at a value sufficiently greater than the number of nodes.

The linear programming problem expressed by Expression (8) is created by referring to the following literature: E. R. Gansner, E. Koutsofios, S. C. North, and K. Vo, "A Technique for Drawing Directed Graphs", IEEE Transactions on Software Engineering, vol. 19, pp. 214-230, 1993.

The linear programming problem will be briefly described. First, based on the aforementioned definitions of the edge "E" and the variable $\lambda$, it is preferable that the value of the variable $\lambda_v$ according to the global rank of the sensor group "v", which is the start point of each edge (which has low local rank), is greater than the value of the variable $\lambda_w$ according to the global rank of the sensor group "w", which is the end point of each edge (which has high local rank). The linear programming problem described above contains a constraint condition $\lambda_v - \lambda_w \geq 1 - s_{(v,w)}$. In a case where each $s_{(v,w)}$ in a solution of the linear programming problem is smaller than 1, all local ranks are satisfied in the global ranks.

The local ranks only show that the priority of the sensor group "w" is higher than the priority of the sensor group "v"

but does not show the difference in the degree of drift failure between the sensor groups. Therefore, the smaller the value of $\lambda_v$-$\lambda_w$, the smaller the discrepancy between the local ranks and the global ranks. In view of this fact, in the linear programming problem described above, the objective function contains $\lambda_v$-$\lambda_w$, and a solution having a small value of $\lambda_v$-$\lambda_w$ is derived.

The global rank determiner 9 uses a method for solving general linear programming to solve the linear programming problem described above and derives the value of the variable λ corresponding to each sensor group. The global rank determiner 9 then determines, as the global ranks, the sensor group names arranged in the ascending order of the value of the corresponding variables λ (step "S12").

For example, in a case where $\lambda_A$=1, $\lambda_B$=2, and $\lambda_C$3 as a solution of the linear programming problem, the global ranks are as follows: The sensor group "A" (device "A") has the first rank; the sensor group "B" (device "B") has the second rank; and the sensor group "C" (device "C") has the third rank. The global rank determiner 9 forwards the thus obtained global ranks to the display 10.

The display 10 then creates image data or text data according to the global ranks received from the global rank determiner 9 and causes the display device 103 to display the global ranks (step "S13"). As a result, the global ranks are displayed, for example, in the format shown in FIG. 5.

The simple integration method will next be described. The simple integration method described herein is an integration method for counting the number of data items in which each sensor group has been determined as a sensor group having a high local rank and determining a sensor group having a large count as a sensor group having a high global rank. According to the simple integration method, using the count allows determination of global ranks with a smaller amount of computation although the simple integration method is inferior to the linear programming integration method described above in terms of the satisfiability of the local ranks.

The global rank determiner 9, when it is notified by the integration method selector 8 that the integration method is the simple integration method, extracts local ranks each having the effective flag of 1 from the array "rslt" (step "S15"). In the following description, the extracted local rank data group is expressed in the directed graph format, the graph "G":=(V, E). "V" represents a set of nodes of the graph "G". The nodes are each a sensor group name. "E" represents a set of edges. The start point of each of the edges is a low-local-rank sensor group name, and the end point of each of the edges is a high-local-rank sensor group name.

The global rank determiner 9 then refers to the extracted data group, counts, for each sensor group, the number of data items in which the sensor group has been determined as a sensor group having a high local rank, and holds the count (step "S16").

For example, in a case where the extracted data group contains data items [A, B, 1], [A, C, 1], [A, D, 1], [C, B, 1], [D, B, 1], and [C, D, 1], the count for the sensor group "A" is 3, the count for the sensor group "B" is 0, the count for the sensor group "C" is 2, and the count for the sensor group "D" is 1. This corresponds to calculation of an in-degree with respect to all nodes of the graph "G".

The global rank determiner 9 subsequently determines, as the global ranks, the sensor group names arranged in the descending order of the count (step "S17"). As a result, a sensor group having a greater count has a higher global rank. For example, in the case where the counts for the sensor groups "A", "B", "C", and "D" are 3, 0, 2, and 1, respectively, as described above, the global ranks are as follows: The sensor group "A" (device "A") has the first rank; the sensor group "C" (device "C") has the second rank; the sensor group "D" (device "D") has the third rank; and the sensor group "B" (device "B") has the fourth rank. The global rank determiner 9 forward the thus obtained global ranks to the display 10.

The display 10 then creates image data or text data according to the global ranks received from the global rank determiner 9 and causes the display device 103 to display the global ranks (step "S13"). As a result, the global ranks are displayed, for example, in the format shown in FIG. 5.

The counts described above each represent the strength of the tendency to have a high local rank. Basically, allocating a high global rank to a sensor group having a tendency to have a high local rank allows an increase in the satisfiability of the local ranks. Therefore, ranking the sensor groups in the descending order of the count allows determination of global ranks having high local rank satisfiability, although this method is inferior to the linear programming integration method described above. Further, the calculation of the counts and the rearrangement of the sensor group in the descending order can be achieved with a smaller amount of computation than solving linear programming by using the linear programming integration method described above.

As described above, the diagnosis device according to the present embodiment estimates drift failure of each sensor and determines the priority (global rank) of each device (each sensor group) in the inspection based on the estimated result. Each sensor group has a higher priority when each sensor contained in the sensor group has a greater estimated degree of drift failure.

The decision maker who makes decision on the inspection can select a device in accordance with the priorities determined by the diagnosis device to select on a priority basis a sensor group containing a sensor having a high estimated degree of drift failure. As a result, the sensors can be efficiently inspected.

The case where the estimator 4 estimates the amount of drift of each sensor has been described by way of example. The estimator 4 may instead estimate whether or not drift failure has occurred in each sensor. In this case, the global ranks can be determined by using the following method.

The estimator 4 first estimates the amount of drift of each sensor and compares the estimated amount of drift with an acceptable amount of drift. In a case where the estimated amount of drift is greater than the acceptable amount of drift, the estimator 4 determines that drift failure has occurred, whereas in a case where the estimated amount of drift is smaller than or equal to the acceptable amount of drift, the estimator 4 determines that no drift failure has occurred.

The estimator 4 then creates estimation results as follows: a sensor having been determined that drift failure has occurred has an estimation result of 1; and a sensor having been determined that no drift failure has occurred has an estimation result of 0. As a result, an estimation result $R \in R^{n \times m}$ in the form of Expression (1) is obtained.

The corrector 5 subsequently corrects the estimation result "R". In this process, since each element of the estimation result "R" is 0 or 1, no normalization of the estimation result "R" is required. The corrector 5 therefore only needs to adjust the data size of the estimation result "R" and calculate a corrected estimation result "$R_2$".

The following processes are the same as those described above. That is, the local rank determiner 7 may determine the local ranks based on the corrected estimation result "$R_2$" and the comparison method selected by the comparison method selector 6, and the global rank determiner 9 may determine the global ranks based on the local ranks and the integration method selected by the integration method selector 8. As described above, even in the case where the estimation result shows whether or not drift failure has occurred, the global ranks can be determined as described above.

Second Embodiment

A diagnosis device according to a second embodiment will be described with reference to FIGS. 9 to 11. In the present embodiment, a diagnosis device that corrects the normalized estimation result "$R_1$" without performing random sampling will be described.

Figure 9:
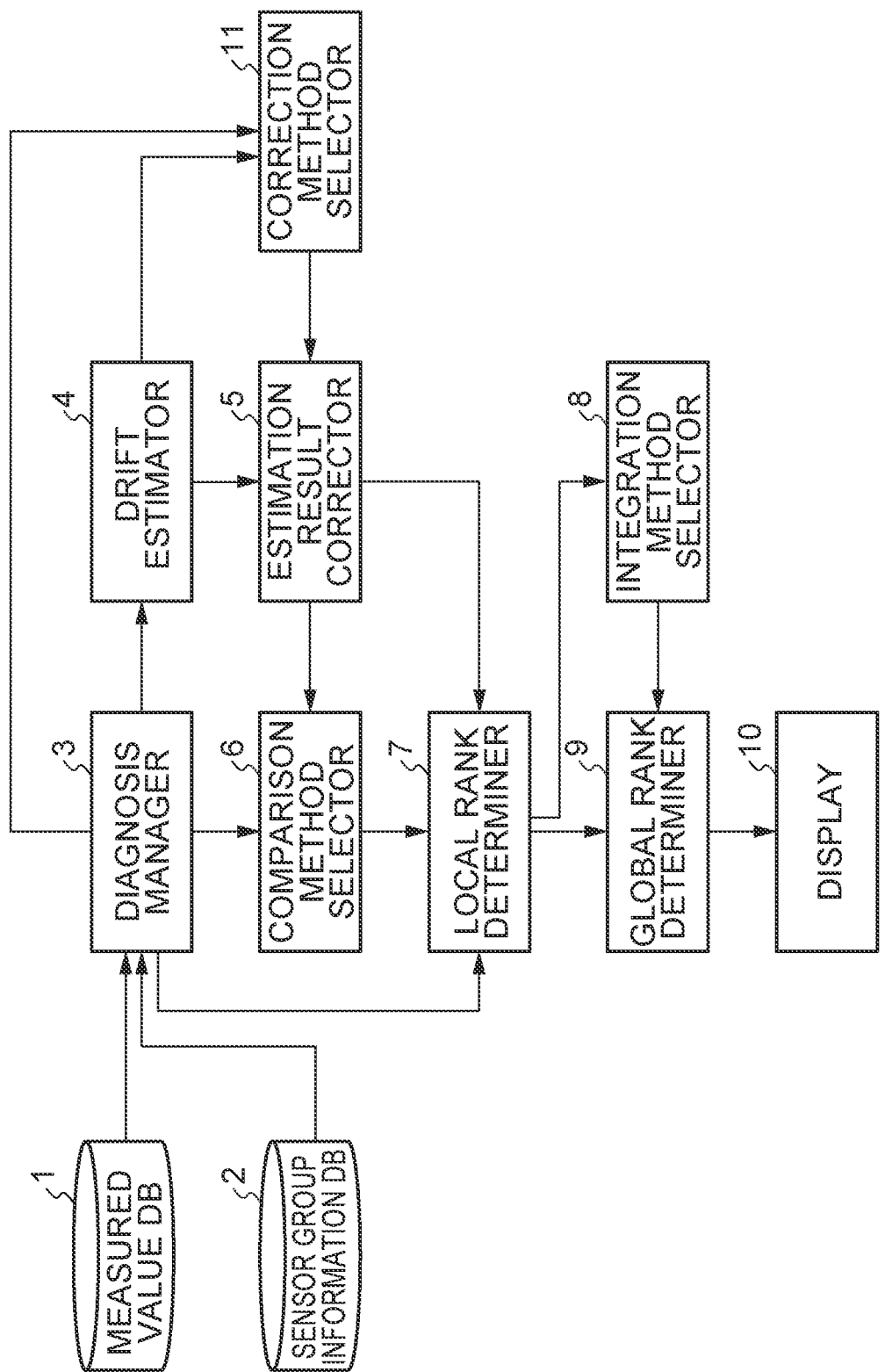
FIG. 9 shows the system configuration of a sensor failure diagnosis device according to a second embodiment.
Figure 10:
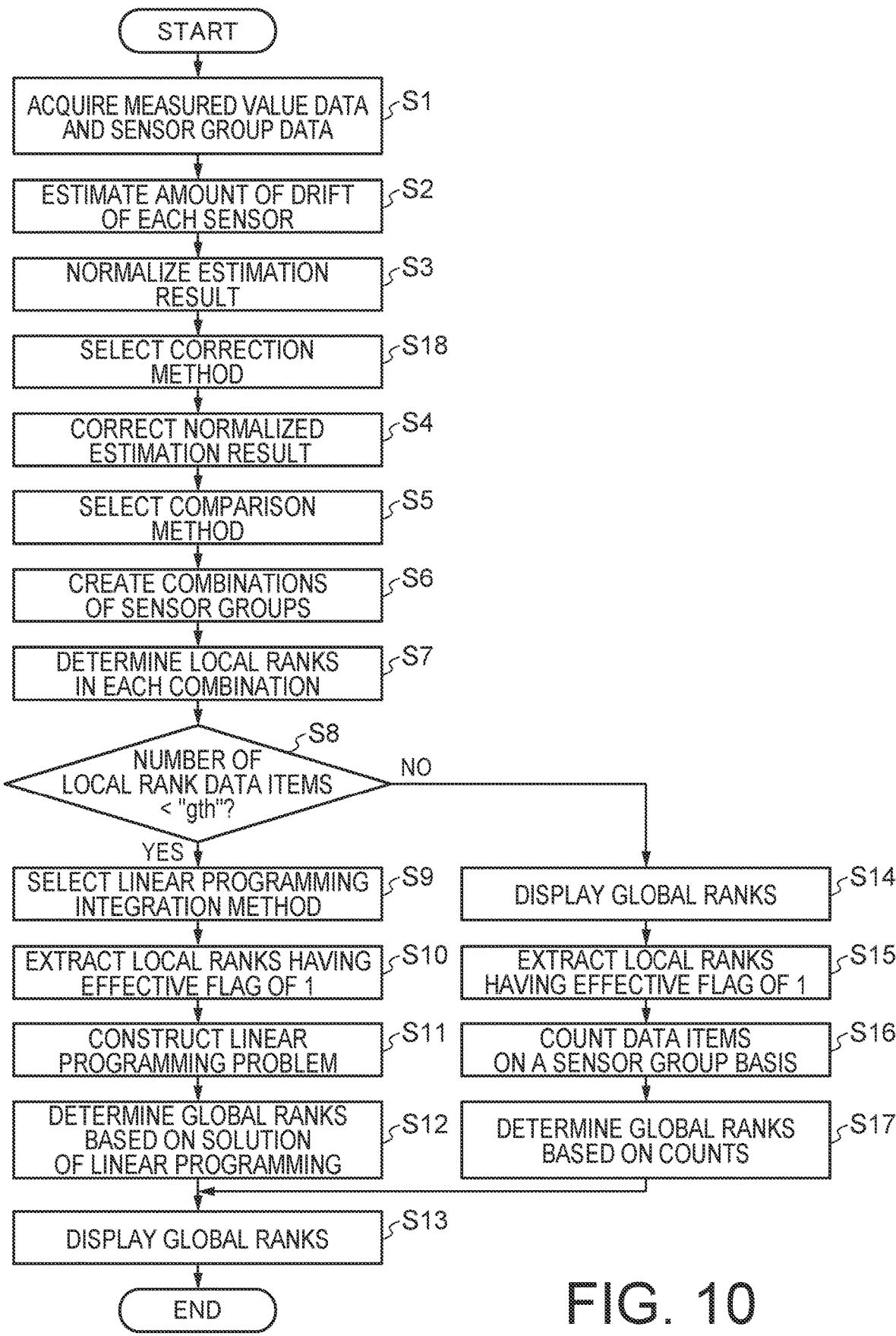
FIG. 10 is a flowchart showing an example of the diagnosis.

FIG. 9 shows an example of the diagnosis device according to the present embodiment. The diagnosis device shown in FIG. 9 includes a correction method selector 11. The other configurations are the same as those in FIG. 2.

The correction method selector 11 selects a correction method used by the estimation result estimator 5 based on the measured value data and the sensor group information received from the manager 3 and the estimation result "R" received from the estimator 4. The correction method described herein is a method for correcting the normalized estimation result "$R_1$" to suppress influence of disturbance. The correction method selector 11 notifies the selected correction method to the corrector 5. In the present embodiment, the manager 3 forwards the measured value data and the sensor group information acquired from the measured value DB 1 and the sensor group information DB 2 to the correction method selector 11, as described above.

The operation of the diagnosis device according to the present embodiment will next be described. FIG. 10 is a flowchart showing an example of the diagnosis performed by the diagnosis device according to the present embodiment. The flowchart of FIG. 10 is the flowchart of FIG. 7 to which step "S18" is added. In the example shown in FIG. 10, step "S18" is added as a step after step "S3" but may instead be added as a step after step "S2". Further, in the present embodiment, the processes in steps "S4" and "S7" differ from those in the first embodiment. The other steps in the present embodiment are the same as those in the first embodiment. Steps "S18", "S4", and "S7" will each be described below.

(Step "S18")

Step "S18" will first be described. The correction method selector 11, when it receives the estimation result "R" from the estimator 4, selects a method for correcting the normalized estimation result "$R_1$" used by the corrector 5 (step "S18"). Specifically, the correction method selector 11 selects a variable-length argument function "rsim:$R^m \to R$".

The variable-length argument function "rsim" is a function for evaluating the degree of drift failure on a sensor group basis. The variable-length argument function "rsim" returns an evaluation value of each row of the normalized estimation result "$R_1$". Therefore, when the normalized estimation result "$R_1$" is substituted into the variable-length argument function "rsim", "n" evaluation values are obtained. The variable-length argument function "rsim" is so designed in advance as to return a greater evaluation value when the degree of drift failure on a sensor group basis is higher, that is, the estimated amount of drift contained in each row is greater. In the present embodiment, the reason why the variable-length argument function "rsim" is used as the correction method is that it is expected that the number of sensors "m" contained in a sensor group varies on a sensor group basis.

The variable-length argument function "rsim" can, for example, be "mean(abs(•))". The function "abs(•):$R^m \to R^m$" is a variable-length argument function that converts the value of each element of a vector that is assigned as the argument (each row vector of normalized estimation result "$R_1$") into the absolute value of the element and returns the absolute value. The function "mean(•):$R^m \to R$" is a variable-length argument function that returns the average of the elements of a vector that is assigned as the argument (each row vector of normalized estimation result "$R_1$" having elements each converted into absolute value). Functions usable as the variable-length argument function "rsim" are not limited to those described above and can be arbitrarily designed.

The correction method selector 11 stores in advance a plurality of candidates of the variable-length argument function "rsim", such as those described above. The variable-length argument functions "rsim" are related to respective predetermined conditions. The conditions are each set in accordance, for example, with a measured value from a sensor, the statistic properties of the measured value, the sensor group information, the estimation result "R", and the statistic properties of the estimation result R.

FIG. 11 shows an example of a table that is provided in the correction method selector 11 and stores the candidates of the variable-length argument function "rsim". The table shown in FIG. 11 stores three candidates "$rsim_1$", "$rsim_2$", and "$rsim_3$" of the variable-length argument function "rsim". The candidates are each related to its priority and condition. For example, the candidate "$rsim_1$" has the first priority and a condition in which "the sensors are all thermometers and the measurement state of each set of measured value data is the steady state."

The correction method selector 11 refers to a table, such as that shown in FIG. 11, based on the measured value data and the sensor group information received from the manager 3 and the estimation result "R" received from the estimator 4. The correction method selector 11 then selects, as the correction method used by the corrector 5 (variable-length argument function "rsim"), a candidate of the variable-length argument function "rsim" that satisfies the condition and has the highest priority. The correction method selector 11 notifies the selected correction method (variable-length argument function "rsim") to the corrector 5.

(Step "S4")

Step "S4" will next be described. Having been notified about the correction method from the correction method selector 11, the corrector 5 uses the notified correction method to correct the normalized estimation result "$R_1$" for each sensor group (step "S4") to calculate a corrected estimation result. Specifically, the corrector 5 first expresses the normalized estimation result "$R_1$" for each sensor group in a row vector as follows:

[Expression 9]

$$R_1 = [\rho_1, \rho_2, \ldots, \rho_n]^T \in \mathbb{R}^{n \times m} \quad (9)$$

Expression (9) is the same as Expression (3). That is, in Expression (9), $\rho_i$ ("i"=1 to "n") is a row vector corresponding to the "i"-th row of the normalized estimation result "$R_1$".

The corrector 5 then substitutes each row vector $\rho_i$ into the variable-length argument function "rsim" to calculate an evaluation value rsim($\rho_i$) of the row vector $\rho_i$ and creates a sorted estimation result "$R_3$", which is formed of the row vectors $\rho_i$ of the normalized estimation result "$R_1$" sorted in the ascending order of the evaluation value. The sorted estimation result "$R_3$" is expressed by the following expression:

[Expression 10]

$$R_3 = [\rho_{asc,1}, \rho_{asc,2}, \ldots, \rho_{asc,n}]^T \in \mathbb{R}^{n \times m}$$

$$s.t. \rho_{asc,i} \in [\rho_1, \rho_2, \ldots, \rho_n] \text{ for } i=1,2,\ldots,n$$

$$r\text{sim}(\rho_{asc,1}) \leq r\text{sim}(\rho_{asc,2}) \leq \ldots \leq r\text{sim}(\rho_{asc,n}) \quad (10)$$

The "i"-th element $\rho_{asc,i}$ of the sorted estimation result "$R_3$" is a row vector $\rho$ having an "i"-th smallest evaluation value. The corrector 5 calculates a corrected estimation result "$R_4$" in the present embodiment based on the sorted estimation result "$R_3$". The corrected estimation result "$R_4$" is expressed by the following expression:

[Expression 11]

$$R_4 = [\gamma(R_3, 1), \gamma(R_3, 2), \ldots, \gamma(R_3, n)]^T \in \mathbb{R}^{n \times m} \quad (11)$$

$$\gamma(R_3, i) := \frac{1}{i} \sum_{j=1}^{i} \rho_{asc,j}$$

The "i"-th element $\gamma(R_3, i)$ of the corrected estimation result "$R_4$" is the average of the first row vector (row vector having smallest evaluation value) $\rho_{asc,1}$ to the "i"-th row vector (row vector having "i"-th smallest evaluation value) $\rho_{asc,i}$ of the sorted estimation result "$R_3$". Averaging the row vectors of the normalized estimation result "$R_3$" as described above allows suppression of influence of disturbance, as the random sampling in the first embodiment.

The corrected estimation result "$R_4$" in the present embodiment is a matrix having "n" rows and "m" columns, as seen from Expression (11). The corrector 5 calculates the corrected estimation result "$R_4$" by performing the method described above on the normalized estimation result "$R_1$" for each sensor group. The corrector 5 forwards the thus obtained corrected estimation result "$R_4$" for each sensor group to the comparison method selector 6 and the local rank determiner 7.

(Step "S7")

Step "S7" will next be described. The local rank determiner 7 selects one of the combinations stored in the array "comb", compares the corrected estimation results "$R_4$" for two sensor groups contained in the selected combination with each other, determines the local ranks of the two sensor groups in accordance with the result of the comparison, and save the determined local ranks in the array "rslt" (step "S7"). The local rank determiner 7 performs the local rank determination described above on the entirety or part of the combinations saved in the array "comb".

The local rank determination will be specifically described below with reference to the case where the combination containing the sensor groups "A" and "B" is selected. In the local rank determination, the corrected estimation result "$R_4^{(A)}$" for the sensor group "A" and the corrected estimation result "$R_4^{(B)}$" for the sensor group "B" are compared with each other.

The local rank determiner 7 first substitutes the corrected estimation result "$R_4^{(A)}$" for the sensor group "A" into the variable-length argument function "sim" notified from the comparison method selector 6 to calculate an evaluation value vector $\xi^{(A)} \in \mathbb{R}^{N(A)}$ for the sensor group "A". The evaluation value vector $\xi^{(A)}$ is expressed by the following expression:

[Expression 12]

$$\vec{\xi}^{(A)} := [\xi_1^{(A)}, \xi_2^{(A)}, \ldots, \xi_{n^{(A)}}^{(A)}]^T \in \mathbb{R}^{n^{(A)}} \quad (12)$$

The evaluation value vector $\xi_i^{(A)}$ ("i"=1 to "$n^{(A)}$") in Expression (12) is an evaluation value corresponding to the "i"-th row vector $\gamma(R_3, i)^{(A)}$ in the corrected estimation result "$R_4^{(A)}$". That is, $\xi_i^{(A)} = \text{sim}(\gamma(R_3, i)^{(A)})$.

Similarly, the local rank determiner 7 substitutes the corrected estimation result "$R_4^{(B)}$" for the sensor group "B" into the variable-length argument function "sim" notified from the comparison method selector 6 to calculate an evaluation value vector $\xi^{(B)} \in \mathbb{R}^{n^{(B)}}$ for the sensor group "B".

In the present embodiment, the number of rows "n" is not unified in the corrected estimation results "$R_4$". The number of rows "$n^{(A)}$" for the sensor group "A" and the number of rows "$n^{(B)}$" for the sensor group "B" therefore do not always coincide with each other.

The local rank determiner 7 then creates a vector $\xi^{(A,B)} \in \mathbb{R}^{n^{(A)}+n^{(B)}}$, in which the elements of the evaluation vectors $\xi^{(A)}$ and $\xi^{(B)}$ are merged with each other. The vector $\xi^{(A,B)}$ is expressed as follows:

[Expression 13]

$$\vec{\xi}^{(A,B)} := [\xi_1^{(A)}, \xi_2^{(A)}, \ldots, \xi_{n^{(A)}}^{(A)}, \xi_1^{(B)}, \xi_2^{(B)}, \ldots, \xi_{n^{(B)}}^{(B)}]^T \in \mathbb{R}^{n^{(A)}+n^{(B)}} \quad (13)$$

The local rank determiner 7 subsequently sorts the elements of the vector $\xi^{(A,B)}$ in the ascending order. The sorted vectors are called a vector $\xi_{asc}^{(A,B)}$. The vector $\xi_{asc}^{(A,B)}$ corresponds to a vector having the evaluation values of the sensor groups "A" and "B" arranged in the ascending order (ascending order of degree of drift failure).

The local rank determiner 7 then calculates a vector $\zeta^{(A)} \in \mathbb{R}^{n^{(A)}+n^{(B)}}$ for the sensor group "A". The vector $\zeta^{(A)}$ is expressed by the following expression:

[Expression 14]

$$\vec{\zeta}^{(A)} := [\text{wratio}_A(\vec{\xi}_{asc}^{(A,B)}, 1), \text{wratio}_A(\vec{\xi}_{asc}^{(A,B)}, 2), \ldots,$$
$$\text{wratio}_A(\vec{\xi}_{asc}^{(A,B)}, n^{(A)}+n^{(B)})]^T \in \mathbb{R}^{n^{(A)}+n^{(B)}} \quad (14)$$

The "i"-th ("i"=1 to "$n^{(A)}+n^{(B)}$") element $\text{wratio}_A(\xi_{asc}^{(A,B)}, i)$ of the vector $\zeta^{(A)}$ is the ratio of the elements of the evaluation value $\xi^{(A)}$ for the sensor group "A" contained in the first to "i"-th elements of the vector $\xi_{asc}^{(A,B)}$ with the ratio weighted by the numbers of rows "$n^{(A)}$" and "$n^{(B)}$" for the sensor groups "A" and "B". Assume now that the number of elements of the evaluation value $\xi^{(A)}$ for the sensor group "A" contained in the first to "i"-th elements of the vector $\xi_{asc}^{(A,B)}$ is $\text{cnt}_A(\xi_{asc}^{(A,B)}, i)$, and $\text{wratio}_A(\xi_{asc}^{(A,B)}, i)$ is expressed by the following expression:

[Expression 15]

$$\text{wratio}_A(\vec{\xi}_{asc}^{(A,B)}, i) := \frac{\text{cnt}_A(\vec{\xi}_{asc}^{(A,B)}, i)/n^{(A)}}{\text{cnt}_A(\vec{\xi}_{asc}^{(A,B)}, i)/n^{(A)} + (i - \text{cnt}_A(\vec{\xi}_{asc}^{(A,B)}, i))/n^{(B)}} \quad (15)$$

Similarly, the local rank determiner 7 calculates a vector $\zeta^{(B)} \in \mathbb{R}^{n^{(A)}+n^{(B)}}$ for the sensor group "B". The "i"-th ("i"=1 to "$n^{(A)}+n^{(B)}$") element $\text{wratio}_B(\xi_{asc}^{(A,B)}, i)$ of the vector $\zeta^{(B)}$ is the ratio of the elements of the evaluation value $\xi^{(B)}$ for the sensor group "B" contained in the first to "i"-th elements of the vector $\xi_{asc}^{(A,B)}$ with the ratio weighted by the numbers of rows "$n^{(A)}$" and "$n^{(B)}$" for the sensor groups "A" and "B". Assume that the number of elements of the evaluation value $\xi^{(B)}$ for the sensor group "B" contained in the first to "i"-th elements of the vector $\xi_{sc}^{(A, B)}$ is $cnt_B(\xi_{asc}^{(A,B)},i)$, and $wratio_B(\xi_{asc}^{(A,B)},i)$ is expressed by the following expression:

[Expression 16]

$$wratio_B(\xi_{asc}^{(A,B)}, i) := \frac{cnt_B(\xi_{asc}^{(A,B)}, i)/n^{(B)}}{cnt_B(\xi_{asc}^{(A,B)}, i)/n^{(B)} + (i - cnt_B(\xi_{asc}^{(A,B)}, i))/n^{(A)}} \quad (16)$$

The terms $wratio_A(\xi_{asc}^{(A,B)},i)$ and $wratio_B(\xi_{asc}^{(A,B)},i)$ are each a value greater than or equal to 0 but smaller than or equal to 1. The sum of $wratio_A(\xi_{asc}^{(A,B)},i)$ and $wratio_B(\xi_{asc}^{(A,B)},i)$ is 1. Further, $wratio_A(\xi_{asc}^{(A,B)}, n^{(A)}+n^{(B)})$ and $wratio_B(\xi_{asc}^{(A,B)},n^{(A)}+n^{(B)})$ are each 0.5. In a case where the number of rows "$n^{(A)}$" for the sensor group "A" is equal to the number of rows "$n^{(B)}$" for the sensor group "B", $wratio_A(\xi_{asc}^{(A,B)},i)$ and $wratio_B(\xi_{asc}^{(A,B)},i)$ are equal to $ratio_A(\xi_{asc}^{(A,B)},i)$ and $ratio_B(\xi_{asc}^{(A,B)},i)$ in the first embodiment, respectively.

The local rank determiner 7 extracts, out of the elements of the vector $\zeta^{(A)}$, an element having a maximum value smaller than 1 as the maximum $\zeta_{max}^{(A)}$, extracts, out of the elements of the vector $\zeta^{(B)}$, an element having a maximum value smaller than 1 as the maximum $\zeta_{max}^{(B)}$, and compares the maximum value $\zeta_{max}^{(A)}$ and the maximum value $\zeta_{max}^{(B)}$ with each other. The maximum values $\zeta_{max}^{(A)}$ and $\zeta_{max}^{(B)}$ represent how small the degrees of drift failure of the sensor groups "A" and "B".

In the present embodiment, the local ranks are determined in accordance with the comparison of $\zeta_{max}$, which has been invented based on the Wilcoxon rank sum test and in which influence of out-of-range values possibly contained in the estimation results "R" is suppressed so that the local ranks can be appropriately determined, as in the first embodiment, but the method for suppressing the influence of out-of-range values is not limited to the method described above. For example, the local ranks may instead be determined by comparing of the medians of evaluation vectors $\xi$ with each other.

In the case where the maximum value $\zeta_{max}^{(B)}$ is smaller than the maximum value $\zeta_{max}^{(A)}$ ($\zeta_{max}^{(B)}<\zeta_{max}^{(A)}$), the local rank determiner 7 determines the local rank of the sensor group "B" to be higher than the local rank of the sensor group "A". On the other hand, in the case where the maximum value $\zeta_{max}^{(A)}$ is smaller than the maximum value $\zeta_{max}^{(B)}$ ($\zeta_{max}^{(A)}<\zeta_{max}^{(B)}$), the local rank determiner 7 determines the local rank of the sensor group "A" to be higher than the local rank of the sensor group "B". This corresponds to determination of a higher rank of a sensor group having a higher degree of drift failure.

In the case where the maximum value $\zeta_{max}^{(A)}$ is equal to the maximum value $\zeta_{max}^{(B)}$ ($\zeta_{max}^{(A)}=\zeta_{max}^{(B)}$), the local rank determiner 7 determines that the local rank of the sensor group "A" is equal to the local rank of the sensor group "B". This corresponds to unknown local ranks of the sensor groups "A" and "B".

The local rank determiner 7 stores the thus determined local ranks of the sensor groups "A" and "B" in the array "rslt". The local rank determiner 7 also determines the local ranks of the sensor groups in the other combinations by using the same method described above and stores the determined local ranks in the array "rsit".

Having stored the local ranks for the entirety or part of the combinations in the array "rslt", the local rank determiner 7 forwards the array "rslt" to the integration method selector 8 and the global rank determiner 9.

As described above, the diagnosis device according to the present embodiment corrects the normalized estimation results "$R_1$" without performing random sampling. The diagnosis device can then determine the local ranks based on the resultant normalized estimation results "$R_1$" and determine the global ranks based on the local ranks.

The decision maker who makes decision on the inspection can select a device in accordance with the priorities determined by the diagnosis device to select on a priority basis a sensor group containing a sensor having a high estimated degree of drift failure, as in the first embodiment. As a result, the sensors can be efficiently inspected.

The estimator 4 may instead estimate whether or not drift failure has occurred in each sensor also in the present embodiment. The method for determining the global ranks in this case has been described in the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A sensor failure diagnosis device comprising:
   processing circuitry configured to estimate, based on data on measured values from sensors contained in a plurality of sensor groups including a sensor under inspection, whether or not drift failure that is steady deviation of a measured value from a true value has occurred in the sensor under inspection or a degree of the drift failure;
   generate pairs of two sensor groups by combining any two of the plurality of sensor groups, comparing the estimated results of two sensor groups with each other in each pair and determine local ranks that are priorities of the two sensor groups in the inspection for each pair; and
   determine global ranks that are priorities of the plurality of sensor groups in the inspection based on, the local ranks of the two sensor groups in each pair.

2. The sensor failure diagnosis device according to claim wherein:
   the processing circuitry is configured to correct the estimated results to obtain evaluation values; and
   the processing circuitry is configured to use the evaluation values to determine the local ranks.

3. The sensor failure diagnosis device according to claim 2, wherein the processing circuitry is configured to:
   select a method for correcting the estimated results; and
   correct the estimated results by employing the selected method.

4. The sensor failure diagnosis device according to claim 1, wherein the processing circuitry is configured to determine the global ranks of the sensor groups to be higher when the degree of the drift failures of the sensors in the sensor groups are greater.

5. A sensor failure diagnosis method comprising:
estimating, based on data on measured values from sensors contained in a plurality of sensor groups including a sensor under inspection, whether or not drift failure that is steady deviation of a measured value from a true value has occurred in the sensor under inspection or a degree of the drift failure;
generating pairs of two sensor groups by combining any two of the plurality of sensor groups;
comparing the estimated results of two sensor groups with each other in each pair;
determining local ranks that are priorities of the two sensor groups in the inspection for each pair; and
determining global ranks that are priorities of the plurality of sensor groups in the inspection based on the local ranks of the two sensor groups in each pair.

6. A non-transitory computer readable medium having a computer program stored therein which causes a computer to perform processes comprising:
estimating, based on data on measured values from sensors contained in a plurality of sensor groups including a sensor under inspection, whether or not drift failure that is steady deviation of a measured value from a true value has occurred in the sensor under inspection or a degree of the drift failure;
generating pairs of two sensor groups by combining any two of the plurality of sensor groups;
comparing the estimated results of two sensor groups with each other in each pair;
determining local ranks that are priorities of the two sensor groups in the inspection for each pair; and
determining global ranks that are priorities of the plurality of sensor groups in the inspection based on the local ranks of the two sensor groups in each pair.

* * * * *